United States Patent
Vorndran

[11] Patent Number: 6,066,069
[45] Date of Patent: May 23, 2000

[54] CONTROL SYSTEM FOR AN INFINITELY VARIABLE CHANGE-SPEED GEAR WITH A TORQUE CONVERTER WITH A LOCK-UP CLUTCH

[75] Inventor: Ralf Vorndran, Eriskirch, Germany

[73] Assignee: ZF Friedrichshafen AG, Friedrichshafen, Germany

[21] Appl. No.: 09/214,567

[22] PCT Filed: Jul. 25, 1997

[86] PCT No.: PCT/EP97/04047

§ 371 Date: Jan. 7, 1999

§ 102(e) Date: Jan. 7, 1999

[87] PCT Pub. No.: WO98/05887

PCT Pub. Date: Feb. 12, 1998

[30] Foreign Application Priority Data

Aug. 1, 1996 [DE] Germany ............... 196 31 071

[51] Int. Cl.[7] ............................................. F16H 61/14
[52] U.S. Cl. ......................................... 477/38; 477/39
[58] Field of Search ................... 477/38, 39, 43; 192/3.31

[56] References Cited

U.S. PATENT DOCUMENTS

| | | | |
|---|---|---|---|
| 4,393,467 | 7/1983 | Miki et al. | 364/424.1 |
| 5,112,280 | 5/1992 | Sato | 474/18 |
| 5,158,163 | 10/1992 | Suzuki | 192/3.31 |
| 5,160,003 | 11/1992 | Suzuki | 192/3.31 |

FOREIGN PATENT DOCUMENTS

| | | |
|---|---|---|
| 0 297 727 A2 | 1/1989 | European Pat. Off. |
| 0 697 548 A1 | 2/1996 | European Pat. Off. |
| 41 04 542 A1 | 8/1991 | Germany. |
| 41 04 542 C2 | 8/1991 | Germany. |
| 41 11 083 A1 | 10/1991 | Germany. |
| 41 11 083 C2 | 10/1991 | Germany. |
| 196 00 915 | 1/1996 | Germany. |

*Primary Examiner*—Dirk Wright
*Attorney, Agent, or Firm*—Davis and Bujold

[57] ABSTRACT

A control system for a continuously variable transmission (17), especially for control of a lock-up clutch (10) of a torque converter (2). The lock-up clutch (10) is controlled according to a strategy whereby the torque converter (2) is considered as being serially mounted with the continuously variable transmission (17). Engagement and disengagement of the lock-up clutch (10) is exclusively a function of the control of the theoretical engine speed.

11 Claims, 3 Drawing Sheets ated set for the operating state according to an operating strategy. The electronic transmission control 30 (EGS) receives multiple input signals:

CONTROL SYSTEM FOR AN INFINITELY VARIABLE CHANGE-SPEED GEAR WITH A TORQUE CONVERTER WITH A LOCK-UP CLUTCH

The invention relates to a control system for control of a lock-up clutch in a continuously variable transmission.

BACKGROUND OF THE INVENTION

Hydrodynamic torque converters in automatic transmissions chiefly perform the task of making possible a comfortable starting operation with an increased start-up torque and to uncouple the torsional vibrations of the engine from the drive line. With the constantly increasing demands for reducing both fuel consumption and gas emission, it has become necessary further to reduce the losses in the hydrodynamic torque converter. In the first place, this is achieved by optimizing the torque converter itself and by using a (slip regulated) lock-up clutch. The latter objective is to reduce the share of the comfortable but dissipative hydrodynamic power transmission and thus to spare fuel without giving up a sufficient uncoupling of vibrations.

The control of the lock-up clutch essentially consists of a strategy and pressure modulation. In the strategy established is which state the torque converter lock-up clutch assumes, by taking into consideration an optimal consumption and comfort characteristic. At least two basic states (open and closed) have been defined. Together with that, a slipping operation of the torque converter lock-up clutch can be implemented.

DE-A 41 04 542 has disclosed a control system for control of a lock-Lip clutch in a continuously variable transmission. For control a ratio of the speeds of rotation of the input engine and of the primary pulley of the continuously variable transmission is formed. If this value is one, the torque converter lock-Lip clutch is closed. By comparing an actual ratio between the primary and secondary pulleys of the continuously variable transmission with the computed theoretical ratio, it is determined that the torque converter must be activated. In this case, a disengagement signal is generated to disengage the torque converter lock-up clutch. With the engagement and disengagement, time steps become effective in order to ensure that the secondary pressure is adapted to the torques to be transmitted—in accordance with the operating state of the torque converter lock-up clutch. The strategy takes into consideration the basic, functions for control of a torque converter lock-up clutch.

SUMMARY OF THE INVENTION

The problem on which the invention is based is to provide a strategy for control of a lock-up clutch which is a component part of an operating strategy for a continuously variable transmission. A control system for a continuously variable transmission (17) of a motor vehicle having a torque converter (2) with a lock-up clutch (10), especially for control of the lock-up clutch, for locking up the torque converter and means (31 to 42) for detecting input signals which are derived from a driver-vehicle system and processed to an engagement and disengagement signal in accordance with the detected states, characterized in that said lock-up clutch (10) is controlled following a strategy in which the hydrodynamic torque converter (2) is considered as hydrodynamic variator serially mounted with the continuously mounted with the continuously variable transmission (17) and an en disengagement of the lock-up clutch (10) is exclusively function of the control of the engine theoretical speed of rotation (n_Mot_soll).

BRIEF DESCRIPTION OF THE DRAWING(S)

Other features essential to the invention and the advantages resulting therefrom are to be understood from the description that follows of an embodiment with reference to the drawings. The drawings show:

DESCRIPTION OF THE PREFERRED EMBODIMENT(S)

Figure 1:
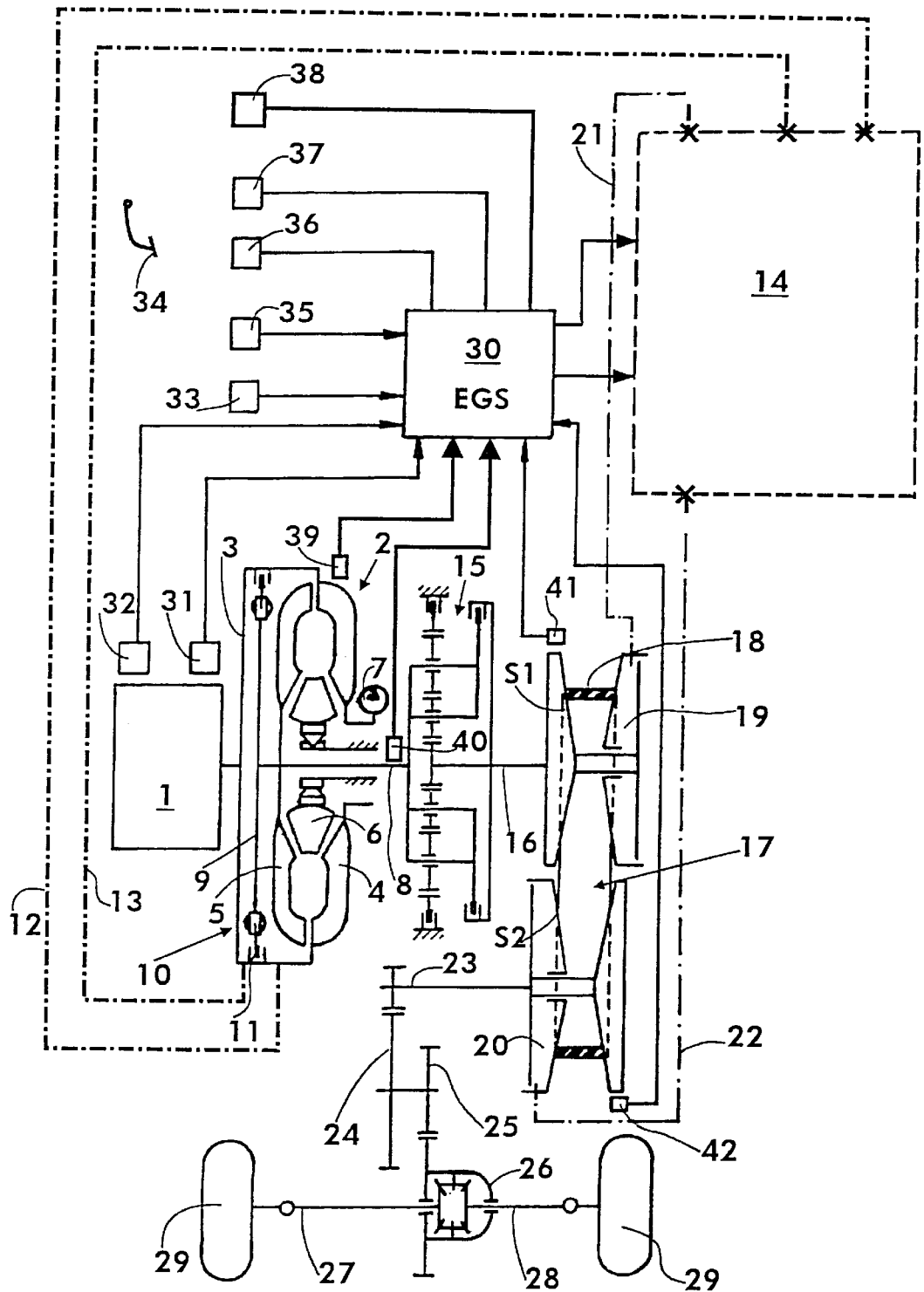
FIG. 1 is a diagram of a continuously variable transmission within a motor vehicle.

FIG. 1 diagrammatically shows a continuously variable transmission: an input unit 1, preferably an internal combustion engine, drives a start-up unit, preferably a hydrodynamic torque converter 2. The hydrodynamic torque converter is constructed in a manner known already: a converter housing 3 is non-rotatably connected with an impeller 4. A turbine wheel 5 is associated with the impeller 4. The arrangement is completed by a stator 6. Simultaneously with the impeller is driven an oil pump 7 to supply pressurized oil to the system.

The turbine wheel 5 is connected with an output shaft 8 of the hydrodynamic torque converter. Also with the turbine wheel connected non-rotatably but axially movably (not shown in the drawing) is a piston 9 of a lock-up clutch 10. On the periphery of the piston 9 is placed a friction lining 11.

To close the lock-up clutch 10, the oil space lying to the right of the piston 9—according to the drawing—is loaded with pressurized oil from a hydraulic line 12. The piston 9 moves to the left and the friction lining comes to abut on the torque converter housing 3. In this case, a through drive exists from the input unit 1 to the output shaft 8.

If the frictional engagement connection should diminish, occurring because the oil pressure prevalent in the pressure space, lying to the right, is either lowered or, under mutual control, moved over to another hydraulic line 13, in the pressure space to the left of the piston 9, according to the drawing, a pressure is built up which moves the piston 9 to the right in an opening direction. The lock-up clutch 10 is then opened so that a differential speed (slip) prevails, between the impeller 4 and the turbine wheel 5.

The hydraulic lines 12 and 13 are attached to a hydraulic control 14.

Connected downstream of the hydrodynamic converter 2 is a reversing set in the form of a planetary gear 15. With the latter, the forward or reverse drive directions is switched by adequate switching components (clutch and brake).

An output shaft 16 drives a continuously variable transmission 17 (variator). The continuously variable transmission essentially comprises a primary pulley S1 and a secondary pulley S2, which are formed from tapered pulleys disposed in pairs and lodged between them is a belt drive member 18. A primary cylinder 19 and a secondary cylinder 20 are attached, via hydraulic lines 21 and 22, to the hydraulic control 14.

An output shaft 23 drives, via reduction steps 24 and 25 and a differential 26, axle half shafts 27 and 28 of driven wheels 29 of a vehicle itself not shown.

The continuously variable transmission 17 is controlled by an electronic transmission control 30 (EGS). The function of the transmission control is to adjust the ratio according to a preset operation strategy. To this end, the processing of a multiplicity of operation parameters is required. For example, a sensor 31 detects the input variable: actual throttle valve position \_DK. With a sensor 32 the actual engine speed n\_Mot is detected. A sensor 33 detects the position of a control member 34 with which the driver of the vehicle communicates a power need (accelerator pedal wish FPW). A sensor 35 signals a manual driver contact.

The enumeration of the possible operation parameters (input variables) is incomplete. The temperature of the hydraulic fluid, for example, is among said variables. This is detected by means of a sensor 36. For certain driving situations additional parameters have to be processed. To detect cornering, it is convenient to utilize the cross acceleration and/or wheel speed differences. This is done with another sensor 37. A sensor 38 detects rises and drops.

The speeds of the impeller 4, of the turbine wheel 5 and of the output shaft 8 are transmitted by sensors 39 and 40 to the electronic transmission control 30.

With the aid of another sensor 41 the speed of rotation $n_{13}$ S1 of the primary pulley is monitored. Another sensor 42 delivers the speed of rotation n\_S2 of the secondary pulley. The input variables are processed by the electronic transmission control to output variables having different purposes (information for indication of system states, control signals for actuators, etc.). A few output variables abut as input variables on the hydraulic control 14 in order to trigger the actuation of electromagnetic valves, for example, for adjustment of the primary and secondary pulleys or also for control of the lock-up clutch.

Point of departure of the strategy for control of the lock-up clutch is the idea of regarding the hydrodynamic torque converter as a hydrodynamic variator serially mounted with the continuously variable transmission. Within the scope of a driving strategy, an operation point is preset. A preferred process for determining an operation point in a dynamic drive range is explained in the applicant's German patent application 196 00 915.4 of Jan. 12, 1996. To that extent, reference will supplementarily be made to the statements contained there. Within the scope of this operation strategy, a reduction ratio iv\_soll or a speed of rotation of the primary pulley n\_S1\_soll is preset. To said presetting corresponds a presetting of the engine speed n\_Mot\_soll. When the lock-up clutch is opened, the engine operation point n\_Mot (regulating variable) directs itself to said drive strategy. Let it be supplementarily observed that the driving range, on one hand, is defined by the driving performance characteristic line FL\_characteristic line up to the characteristic line of the smallest ratio iv\_min\_characteristic line.

With this general standard an operation of the lock-up clutch becomes possible with the following advantages:

In the starting range, when the engine during gas emission runs into the range of the torque converter, the lock-up clutch becomes closed whereby are prevented in an overshoot of the engine above the value n\_S1\_soll of the speed of rotation of the primary pulley, preset by the driving strategy, and thus the negative gradient of speed of rotation of the engine resulting during the closing process.

The theoretical value of the speed of rotation of the engine n\_Mot\_soll is controlled in the whole driving range by the standard of an engine speed of rotation n\_Mot. The regulating characteristic of the lock-up clutch regulator, especially its transition to the closed state (closing quality), is thus a function of the control of the engine theoretical speed of rotation n\_Mot\_soll.

When the lock-up clutch is opened, a drop of the engine to coasting in the torque converter range (undershoot) is prevented. The drop would be felt as a disturbance by the driver because the operation point standard n\_S1\_soll or iv\_soll is abandoned by the sudden drop of the engine and the engine is substantially affected by the coasting characteristic of the torque converter.

Because the engine speed of rotation n\_Mot is linked directly with the standard of an operation point, a flow rate of the oil pump—corresponding to the n\_S1\_soll speed of rotation—is produced when braking. Also, clearly assisted is the downshift in direction to LOW, whereby a substantial problem in connection with a continuously variable transmission is effectively obviated. In addition, too early an uncontrolled drop to idling speed is prevented.

In the technical implementation two cases are to be basically differentiated:

Case 1:

The vehicle moves on flat ground or uphill; and

Case 2:

The vehicle moves downhill.

Figure 3:
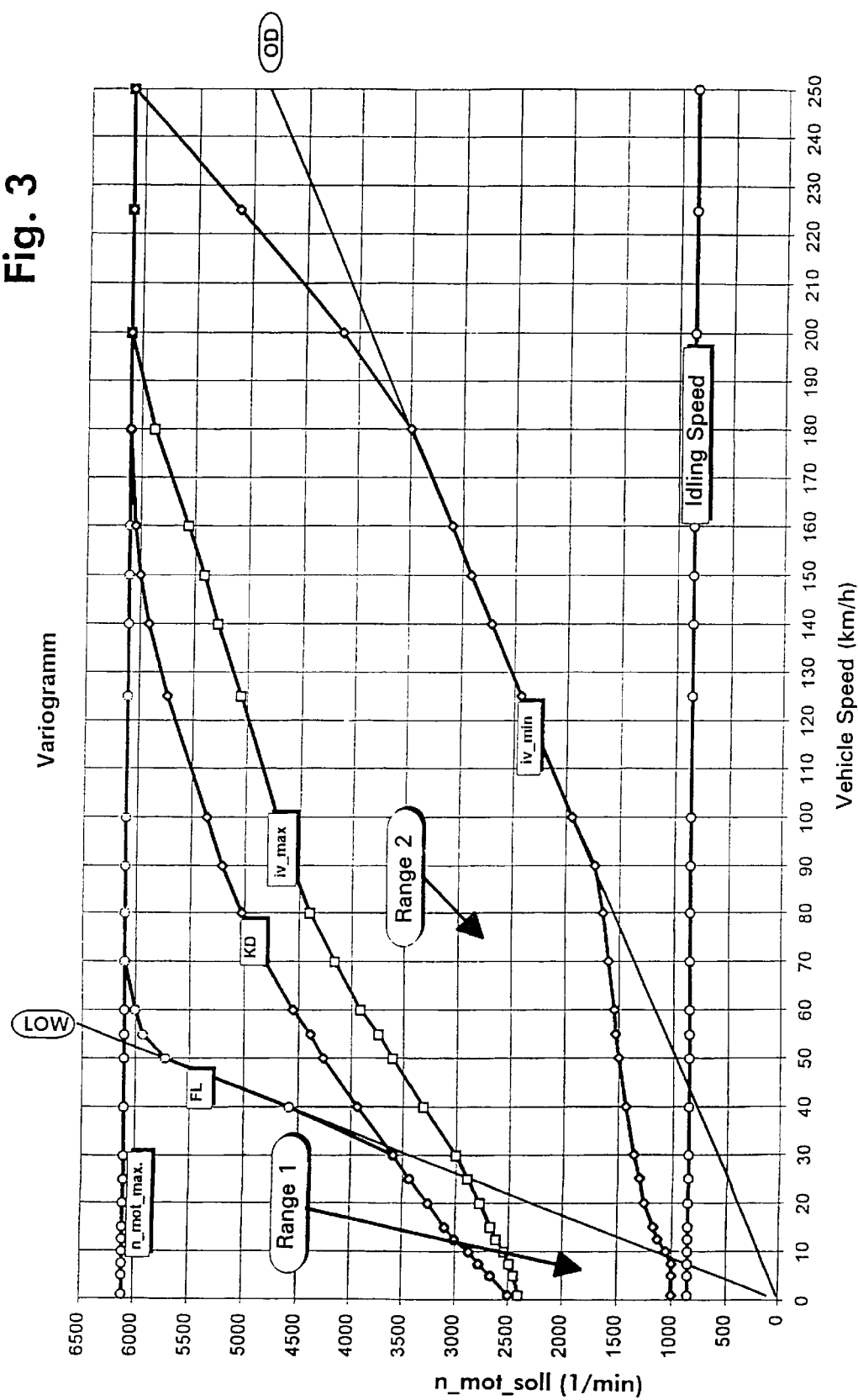
FIG. 3 is a variogram of the continuously variable transmission.

Supplementarily the variogram (FIG. 3) outside range 1 delimited by the iv\_max—, iv\_min— and LOW characteristic line and the range delimited by the LOW— and OD—guide beam (overdrive) (designated here as range 2) must be differently treated.

Depending on said cases and ranges 1 and 2, the standard of the operation point is implemented in different ways. The following definitions apply here:

Regulating variable:

n\_Mot

Control variable:

Range 1: n\_Mot\_soll

Range 2: n\_Mot\_soll corresponding to the theoretical speed of rotation of the primary pulley n\_S1\_soll.

The value n\_S1\_Soll is generated here from the product of the theoretical ratio iv\_soll and the speed of rotation of the secondary pulley n\_S2.

Correcting variable:

for the condition lock-up clutch-close: i\_drwk=p\_wk (correcting variable torque converter clutch pressure corresponding to p\_wk); and for the condition lock-up clutch open: i\_driv corresponding to the pressure in the primary cylinder P\_S1.

Closing of the lock-up clutch:

The standard of an engine theoretical speed of rotation n\_Mot\_soll is generated during a throttle valve position <1.5% (not zero) in the ranges 1 and 2 as follows:

Range 1:

The applied characteristic lines iv\_min— and iv\_max— are converted by the speed of rotation of the secondary pulley n\_S2 to minimum engine speeds of rotation n\_Mot\_min or maximum engine speeds of rotation n\_Mot\_max and laid down in the electronic transmission control as characteristic lines. The ratios calculated to the left of the LOW guide beam n\_S2 thus assume values which are higher than the mechanical LOW ratio. In the actual drive range, for example, via fuzzy control equipment, an engine theoretical value of speed of rotation n\_Mot\_soll is generated which serves as the control of the engine speed of rotation n\_Mot. The standard of the engine theoretical speed of rotation n\_Mot\_soll must result from the parked state of the vehicle. The standard of the operation point n\_Mot\_soll cannot have discontinuity in the transition from the range 1 to the range 2 and is preferably combined with one another.

Range 2:

The standard of the ratio iv_soll within the scope of the operation strategy is converted via the speed of rotation of the primary pulley n_S1 directly to a theoretical engine speed of rotation n_Mot_soll and used as a control variable. n_Mot_soll follows out from the stationary state of the LOW characteristic line up to the intersection point with the iv_min=n_Mot_min characteristic line.

In a position of the throttle valve <1.5% (zero) there apply, when driving on flat ground or uphill, the modes of operation described above are for the ranges 1 and 2.

For driving downhill, the theoretical engine speed of rotation is preset according to the process explained above in relation to range 2. The lock-up clutch is closed at the synchronization point. By synchronization point it is understood that the point at which the value engine theoretical speed of rotation n_Mot_soll, formed from the product of the actual ratio and of the speed of rotation of the secondary pulley n_S2, is higher or equal to the idling speed of rotation of the engine. Thereby is ensuring that the engine is rigidly coupled as early as possible with the adjustment of the continuously variable transmission in order to achieve the best possible engine braking effect.

For opening the lock-up clutch the next process applies:

When opening the lock-up clutch an overlapping gearshift takes place between the lock-up clutch and the continuously variable transmission. With the signal for opening the lock-up clutch, the ratio of the continuously variable transmission is used as a correcting variable in order further to keep the engine on the actual operation point which so far had been used for control of the ratio of the continuously variable transmission. This means: the standard of the ratio iv_soll of the speed of rotation of the primary pulley n_S1_soll becomes the theoretical standard for the engine speed of rotation n_Mot_soll. The objective is to control, in an ideal way, the interference level of the torque converter by the continuously variable transmission. Here the opening of the lock-up clutch can be especially adapted in order to assist the regulator. As to the process of opening the lock-up clutch, no distinction is made regarding a dependence on the tractional resistance.

The basic functions implemented in the electronic transmission control have top priority in relation to the demands on the operation state of the lock-up clutch independently of the operating strategy used.

The main conditions are defined, according to the engagement and disengagement criteria, by the basic functions exclusively by the electronic transmission control independently of the operating strategy chosen. The engagement and disengagement criteria must necessarily be satisfied so that the lock-up clutch can be controlled by a strategy. The information of whether an engagement or disengagement of the lock-up clutch is desired is communicated to the basic functions of the electronic transmission control via an adequate flag Z_WK.

Engagement criteria:

The lock-up clutch is engaged—Z_WK engaged—, when:

n_mot_soll>1 200 l/min AND v_fzg >3 km/h OR n_S2>150 l/min AND

C_getr>5° C. AND brake=0 (that is, the brake is not actuated) AND

Direction of rotation of secondary pulley n_S2=positive.

Wherein v_fzg means the vehicle speed and C_getr, the transmission temperature.

Disengagement criteria:

For the disengagement of the lock-up clutch (open)—Z_WK=disengage, there apply:

Z_WK=disengage when n_Mot<1 200 l/min OR

Z_blr=1 (blocking wheels detected or ABS active).

The closing point for closing the lock-up clutch is established by taking into account particular drive states. In determining the closing point in time, avoided must be drive states in which a closed lock-up clutch:

does not seem necessary (for example, in case of small loads or low vehicle speeds like shunting) or not convenient for reasons of comfort (for example, low driving speed and high ratio or city traffic at the low speed range where very often traction and coasting changes are to be expected).

Figure 2:
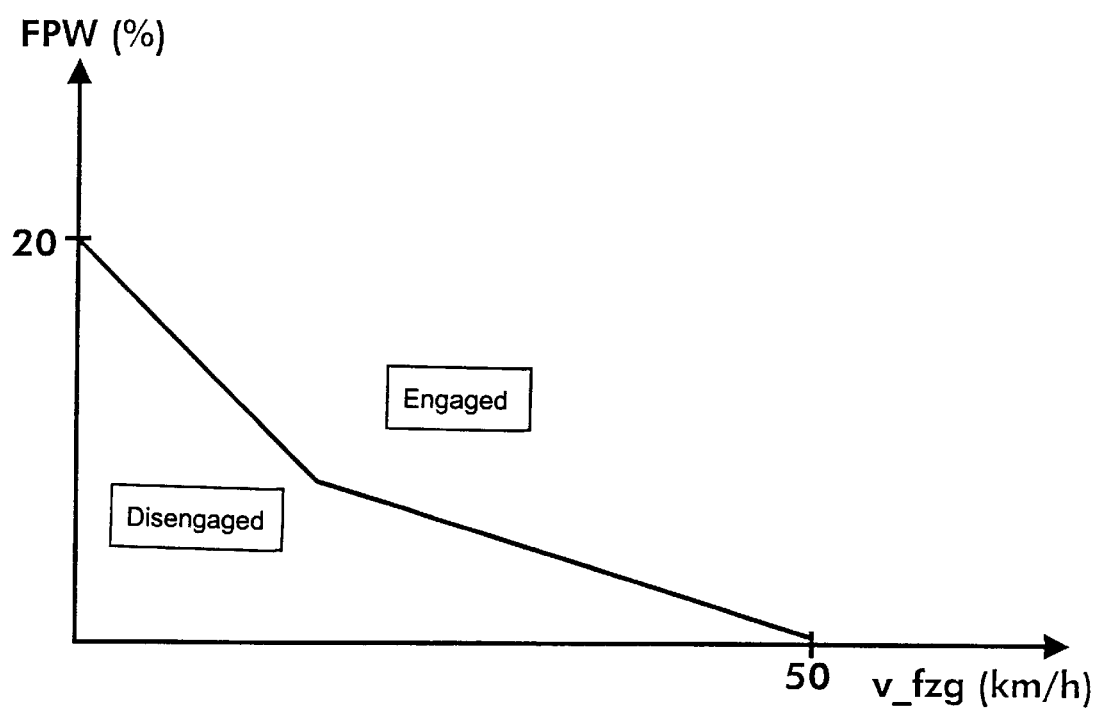
FIG. 2 is a graphic representation for explaining the engagement and disengagement conditions.

For determining the point in time, a simple algorithm can serve in the simplest case. The state flag Z_WK is set to engage as a function of the accelerator pedal wish (FPW) and of the vehicle speed (v_fzg) when the operation point is above a characteristic line. From FIG. 2 tentatively seen is the curve of said characteristic line. At a vehicle speed v_fzg of zero or near zero said ranges are separated from each other by about 20% in an accelerator pedal wish. At a vehicle speed of v_fzg>about 50 km/h, the signal of lock-up clutch engage is always set.

Instead of a simple algorithm, an expanded algorithm can be used. Suitable for this in the first place is a control system according to fuzzy equipment by which the closing point in time can be determined according to several parameters. Preferably, adequate here are the variables: accelerator pedal wish, vehicle speed, ratio and start-up wish.

The point in time for opening the lock-up clutch can also be determined according to a simple algorithm. Here the lock-up clutch is opened, via a characteristic line, by which the vehicle speed and the vehicle deceleration are related to each other. Z_WKA=f(v_fzg,a)

The time for opening the lock-up clutch can also be determine within the scope of an expanded algorithm. The lock-up clutch here is opened according to a stopping and braking wish. The braking and stopping wish, in turn, are generated by fuzzy control equipments. An adaptation for finding out the adequate opening time can be carrier out by field tests.

| Reference numerals |
|---|
| 1 input unit |
| 2 torque converter |
| 3 torque converter housing |
| 4 impeller |
| 5 turbine wheel |
| 6 stator |
| 7 oil pump |
| 8 output shaft |
| 9 piston |
| 10 lock-up clutch |
| 11 friction lining |
| 12 hydraulic line |
| 13 hydraulic line |
| 14 hydraulic control |
| 15 planetary gear |
| 16 output shaft |
| 17 continuously variable transmission |
| 18 belt drive member |
| 19 primary cylinder |
| 20 secondary cylinder |
| 21 hydraulic line |
| 22 hydraulic line |

-continued

| Reference numerals |
| --- |
| 23 output shaft |
| 24 reduction step |
| 25 reduction step |
| 26 differential |
| 27 axle half shaft |
| 28 axle half shaft |
| 29 wheels |
| 30 transmission control |
| 31 sensors |
| 32 sensors |
| 33 sensors |
| 34 control member |
| 35 sensors |
| 36 sensors |
| 37 sensors |
| 38 sensors |
| 39 sensors |
| 40 sensors |
| 41 sensors |
| 42 sensors |

I claim:

1. A control system for a motor vehicle, the control system being used in combination with a vehicle having an engine supplying driving power to a hydrodynamic torque converter (2), with a lockable converter clutch (10), sequentially coupled to a continuously variable transmission (17), and the control system controlling engagement and disengagement of the converter clutch (10) to facilitate the supply of driving power through the hydrodynamic torque converter (2), the control system further comprising:

a plurality of sensors for receiving a plurality of input signals from the vehicle, during operation of the vehicle, to indicate vehicle driving requirements and driving conditions; and strategy means for treating the hydrodynamic torque converter (2) as a hydrodynamic variator sequentially arranged with the continuously variable transmission (17) and for determining an engine nominal speed control (n_Mot_nom), calculated from said input signals from the plurality of sensors, and controlling engagement and disengagement of the converter clutch (10) based solely as a function of the determined engine nominal speed control (n_Mot_nom).

2. The control system according to claim 1, wherein the strategy means, during control of the converter clutch (10) via the engine nominal speed (n_Mot_nom), distinguishes, between a first range (1) and a second range (2), the first range (1) is located outside a variogram and is limited by applicable characteristics of a maximum variator ratio (iv_max), applicable characteristics of a minimum variator ratio (iv_min), and applicable characteristics of a maximum mechanical variator ratio (LOW), and the second range (2) is defined by the applicable characteristics of the mechanically maximum variator ratio (LOW) and applicable characteristics of a mechanically minimum variator ratio (OD).

3. A control system for a motor vehicle, the control system being used in combination with a vehicle having an engine supplying driving power to a hydrodynamic torque converter (2), with a lockable converter clutch (10), sequentially coupled to a continuously variable transmission (17), and the control system controlling engagement and disengagement of the converter clutch (10) to facilitate the supply of driving power through the hydrodynamic torque converter (2), the control system further comprising:

a plurality of sensors for receiving a plurality of input signals from the vehicle, during operation of the vehicle, to indicate vehicle driving requirements and driving conditions; and strategy means for treating the hydrodynamic torque converter (2) as a hydrodynamic variator sequentially arranged with the continuously variable transmission (17) and for determining an engine nominal speed control (n_Mot_nom), calculated from said input signals from the plurality of sensors, and controlling engagement and disengagement of the converter clutch (10) based solely as a function of the determined engine nominal speed control (n_Mot_nom); and the strategy means includes a terrain input indicative of whether the vehicle is traveling on one of level ground, uphill and downhill, and the terrain input is utilized to determine the engine nominal speed (n_Mot_nom).

4. The control system according to claim 2, wherein an engine speed control, in the first range (1), is a function of the engine nominal speed (n_Mot_nom) and, in the second range (2), is a function of the engine nominal speed (n_Mot_nom) in accordance with a nominal speed of a primary disk (n_S1_nom), and the nominal speed of a primary disk (n_S1_nom) is generated from a multiplication of a nominal variator ratio (iv_nom) and a rotational speed of a secondary disk (n_S2).

5. The control system according to claim 4, wherein the engine speed control is such that the engine nominal speed (n_Mot_nom), for a throttle valve position >1.5%, is generated in the first range (1) as follows:

said minimum and maximum variator ratios (iv_min, iv_max) are converted, via the rotational speed of the secondary disk (n_S2), to a minimum engine speed (n_Mot_min) and a maximum engine speed (n_Mot_max), respectively, and stored as characteristics in an electronic transmission control unit (EGS); and for a current drive range, a value is generated, as the engine nominal speed (n_Mot_nom), which serves as the engine speed control.

6. The control system according to claim 4, wherein the engine speed control is such that the engine nominal speed (n_Mot_nom), in the second range (2), is generated as follows:

a specified nominal variator ratio (iv_nom) is converted, via the speed of the primary disk (n_S1), into a desired nominal engine speed (n_Mot_nom) and used as the engine speed control.

7. The control system according to claim 4, wherein the strategy means controls the converter clutch (10), via engine nominal speed control (n_Mot_nom), such that during downhill terrain travel of the vehicle, the converter clutch (10) is engaged provided that the engine nominal speed value (n_Mot_nom), generated from a product of a current variator ratio (iv) and the speed of the secondary disk (n_S2), is at least equivalent to one of an idling speed of the engine and a synchronous speed.

8. The control system according to claim 4, wherein the strategy means controls the converter clutch (10), via the engine nominal speed control (n_Mot_nom), such that upon the strategy means sending a disengagement signal, for disengaging the converter clutch (10), the current variator ratio (iv) of the continuously variable transmission (17) is employed as an actuation parameter for maintaining a current engine operating condition, with at least one of a specified nominal variator ratio (iv_nom) and a specified nominal speed of the primary disk (n_S1_nom) of the variator becoming a specified engine nominal speed (n_Mot_nom).

9. The control system according to claim 1, wherein the strategy means controls the converter clutch (10), via engine nominal speed control (n__Mot__nom), such that the strategy means generates an engagement signal, as a function of an accelerator pedal request (FPW) and a vehicle speed (v__veh), for determining engagement of the converter clutch (10).

10. The control system according to claim 1, wherein the strategy means controls the converter clutch (10), via the engine nominal speed control (n__Mot__nom), such that the strategy means generates a disengagement signal, based upon a relationship of vehicle speed (v__veh) and vehicle deceleration to one another, for determining disengagement of the converter clutch (10).

11. A method for controlling locking of a converter clutch (10) of a motor vehicle, the vehicle having an engine supplying driving power to a hydrodynamic torque converter (2), incorporating the lockable converter clutch (10), sequentially coupled to a continuously variable transmission (17), and the method controlling engagement and disengagement of the converter clutch (10) to facilitate the supply of driving power through the hydrodynamic torque converter (2), the method comprising the steps of:

receiving, via a plurality of sensors, a plurality of input signals from the vehicle, during operation of the vehicle, to indicate vehicle driving requirements and driving conditions; and treating, via a control strategy, the hydrodynamic torque converter (2) as a hydrodynamic variator sequentially arranged with the continuously variable transmission (17), determining an engine nominal speed control (n__Mot__nom), calculated from said input signals from the plurality of sensors, and controlling engagement and disengagement of the converter clutch (10) based solely as a function of the determined engine nominal speed control (n__Mot__nom).

* * * * *